June 22, 1926.
H. G. RAPE
FISHING TOOL FOR BROKEN JAR REINS
Filed Oct. 22, 1923
1,589,896
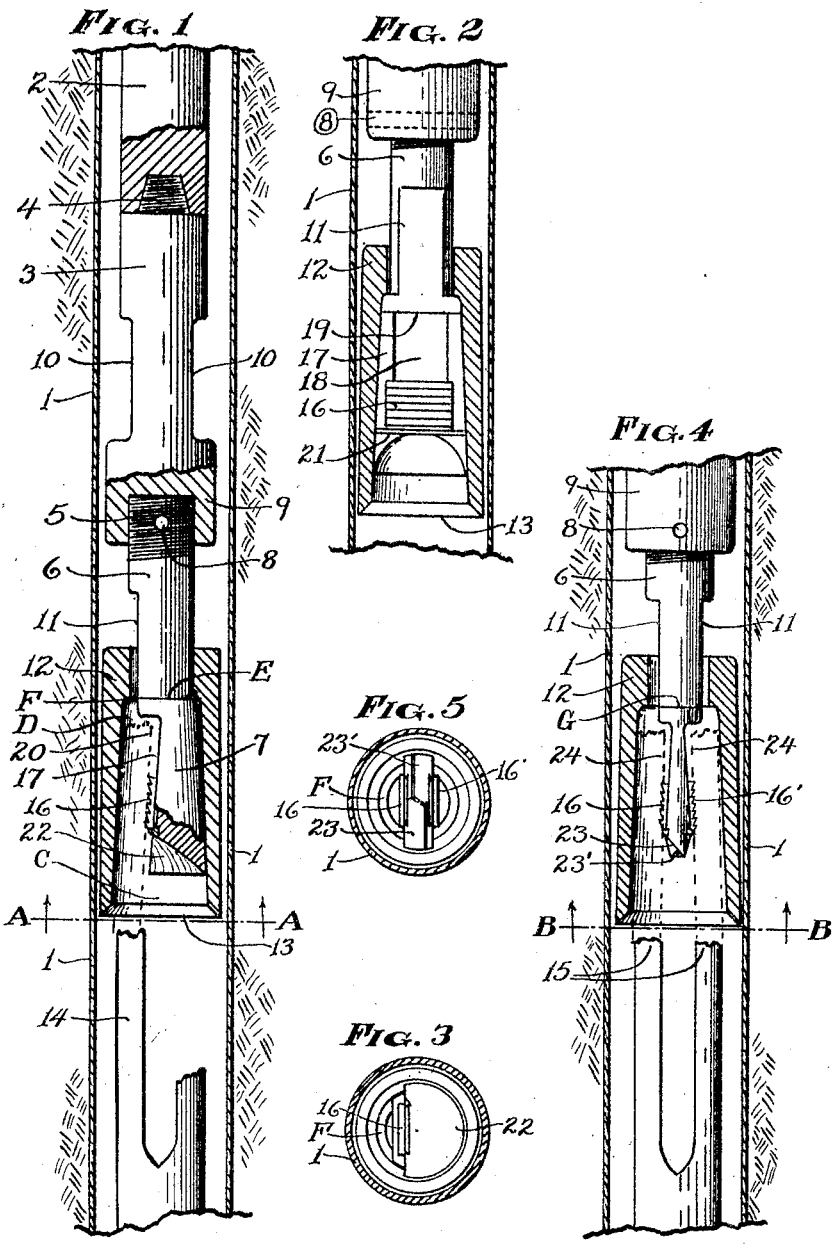
Inventor
Harvey G. Rape
U.G. Charles
Attorney Patented June 22, 1926.

1,589,896

UNITED STATES PATENT OFFICE.

HARVEY G. RAPE, OF WICHITA, KANSAS.

FISHING TOOL FOR BROKEN JAR REINS.

Application filed October 22, 1923. Serial No. 670,122.

My invention relates to improvements in a fishing tool for broken jar reins.

The objects of my invention are as follows:

First; to provide a fishing tool that can be attached to a standard tool stem.

Second; to provide a connecting member between the tool stem and the fishing tool to which two classes of fishing tools may be attached.

Third; to provide a fishing tool having a socket adapted to receive two kinds of grip members.

These and other objects will be hereinafter more fully explained.

Referring to the drawings;

Fig. 1 is an assembled view of the parts interposed within an oil well casing, parts removed for convenience of illustration.

Fig. 2 is a view partly in section of the grip, at right angles to that shown in Fig. 1.

Fig. 3 is an end view on line A—A looking in the direction of arrows.

Fig. 4 is a side view of the double grip and socket, the said socket being shown in section.

Fig. 5 is an end view, taken on line B—B looking in the direction of arrows.

1 is the casing, commonly used in oil well drilling. 2 is the stem of a standard fishing tool. 3 is a connecting member, adapted to fasten on the end of said fishing tool by means of a threaded socket and stud 4. The said member being socketed and threaded as shown at 5, the said socket adapted to receive a shank 6 of the grip stalk 7. The said shank when screwed into the connecting member at 5 is held firmly to prevent revolving by means of a pin 8, passing through the said shank and base 9 of the connecting member 3. The said member being flattened on two sides as shown at 10, the object of which is for the application of a wrench for placing and removing said member from the tool stem 2, and the shank of said grip is flattened as shown at 11 for the application of a wrench to place and remove said grip from the connecting member 3. 12 is a socket being cylindrical in form, and hollowed, and having a tapered hole drilled therein, the same being larger at the bottom at C than at the top at D, and the said socket at its lower extremity having a flange 13 functioning as guiding means to cause the broken rein 14 of a jar member that is lodged in the well by reason of a break as shown to enter said socket. The socket 12 is loosely mounted on the shank 6 so that the manipulations caused by contacting with the broken rein member, will cause it to wobble or slide upward to accommodate for the reception of the said broken member. In assembling the fishing tool, the shank of the grip is passed upward through the bore of the socket and then screwed into the connecting member and locked as heretofore described, and the said socket is held in pendant position as shown by reason of a shoulder E, on said grip engaging with a shoulder F in said socket.

In Fig. 4 is shown a modified way of constructing the grip, same being adapted to clutch both reins of the jar, should the jar be broken at equal lengths approximately as shown at 15, and the socket 12 is made in like manner as that shown in Fig. 1 and is supported on the shank in like manner engaging on the grip shoulder G. 16 is a toothed member slidably mounted in the plane 17 of said grip, and the said toothed member being dovetailed in a race 18, and adapted to slide upward to shoulder 19, and the said plane of said grip being out of parallel alignment with the inside walls of the socket will function as binding means when the broken member 4 is in position as shown by dotted lines 20. When said tool is being hoisted to remove the lost member from the well, the teeth of said member 16 will engage with the surface of the broken member, and in its descent under the weight of said tool, will cause said teeth to imbed in the metal of said tool, wedging said member firmly in the socket and thus the lost tool is gripped and removed from the well.

To remove the said grip member 16 from the race into which it is interposed, a key 21, being dovetailed across the plane of said grip stock and by removing said key, the said toothed member may be removed from the dovetail.

The end of stock at 22 is concaved to function as guiding means for the broken tool member to pass into engagement with the toothed member 16, and in the event of the reins being broken approximately at even lengths which condition is discovered when the fragment is withdrawn from the well, I then insert the tool having the toothed members on each side thereof as shown at 16, and 16' in Fig. 4, and the said grip will function in like manner, engaging both reins of the broken jar simultaneously, binding said members, sufficiently to withdraw the lost tool, and when said fishing tool as shown in Fig. 4 is lowered to engagement with the lost tool, the points of said grip as shown at 23 and 23′ are bevelled in opposite direction, so that the tool will adjust itself to its proper position to engage between the reins of the jar as shown by dotted lines 24.

Such modifications may be employed as lie within the scope of the appended claims, and what I claim as new, and desire to secure by Letters Patent is:

1. In a fishing tool for broken jar reins, a shank adapted to connect to a standard fishing tool, a grip stock on the pendant end of said shank, a shoulder on said grip stock, a socket loosely engaging on said shank and being supported by the shoulder of said grip stock, the said grip stock being housed by said socket, a toothed member slidably mounted in a race in said grip stock, the said socket and stock functioning as jaws when said toothed member engages the broken rein of a jar.

2. In a fishing tool for broken jar reins, a connecting member for an oil well tool stem, a shank and a grip stock integral and connected to said connecting member, said grip stock being cut away on one side and having a dovetailed race in the plane thereof, the end of said grip stock being concaved as guiding means for a broken rein, a socket having an aperture in one end to loosely engage on said shank and the rim of the opposite end of said socket being beveled as guiding means for the broken reins, gripping means within said socket for the broken reins, for the purpose described.

HARVEY G. RAPE.